April 22, 1930. W. ABBY 1,755,857
EXTERMINATOR
Filed March 25, 1929
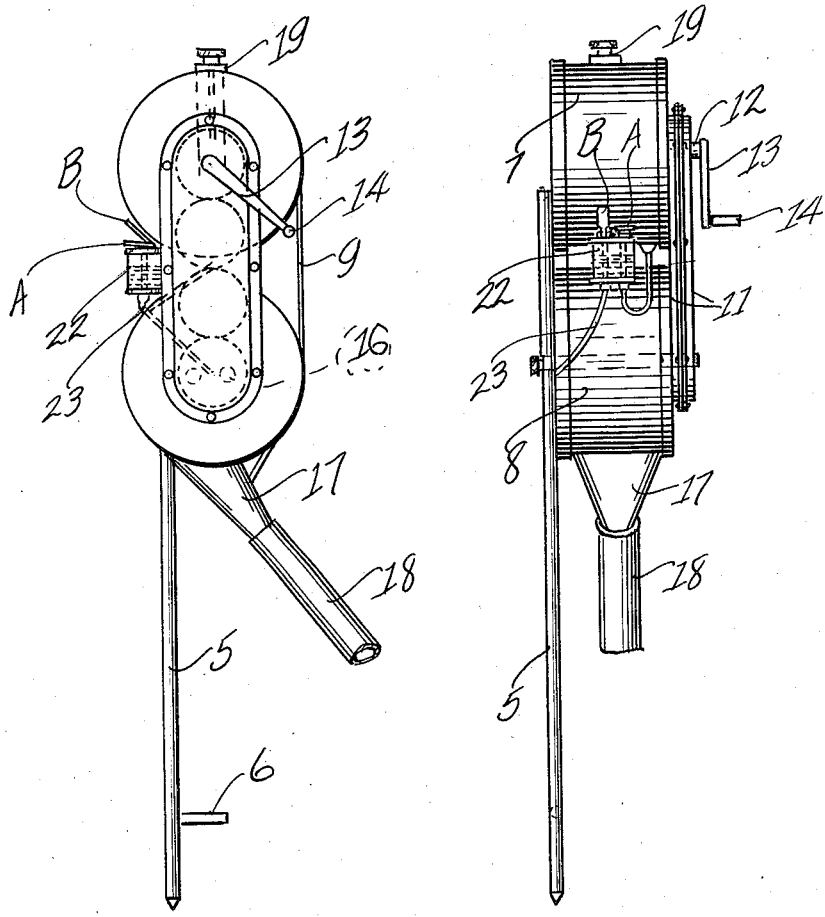
Fig. I.   Fig. II.
INVENTOR.
WARREN ABBY
BY Victor J. Evans
ATTORNEY Patented Apr. 22, 1930

1,755,857

UNITED STATES PATENT OFFICE

WARREN ABBY, OF MARINA, CALIFORNIA

EXTERMINATOR

Application filed March 25, 1929. Serial No. 349,850.

This invention relates to improvements in exterminators, and has particular reference to a device for exterminating small ground animals such as ground squirrels and field mice.

The principal object of this invention is to provide a device which will force a steam of poisonous gas into the burrows of the animals sought to be exterminated.

Another object is to produce a device of this character which is economical to manufacture and simple in construction.

A further object is to provide means whereby a definite quantity of the exterminating fluid may be dispensed.

A still further object is to provide means whereby an unskilled operator may use the same without danger to himself.

Other objects and advantages will be apparent during the course of the following description.

In the accompanying drawing forming a part of this specification and in which like numerals are employed to designate like parts throughout the same, Figure 1 is a side elevation of my improved exterminator, and Figure 2 is a rear elevation of Figure 1.

In the extermination of ground animals, such as field mice and squirrels, it is necessary that the exterminating agent must be forcibly blown into the burrow in order that the gas may reach the innermost pockets and thus perform its function.

I have therefore provided a device wherein a poisonous fluid capable of being gasified is carried, which is combined with a blower for blowing air carrying this exterminating fluid. I have further provided means whereby a definite quantity of the fluid may be blown from the tank and then discharged to the blower.

In the accompanying drawing wherein for the purpose of illustration is shown a preferred example of my invention, the numeral 5 designates a support which is adapted to be driven into the ground through the medium of a foot piece 6. This support is slidably secured to the side of the device as a whole, which consists essentially of a tank 7 preferably of circular cross section, beneath which is a blower casing of the same general shape. This gives to the device a neat appearance and at the same time, renders the same economical to make. The tank 7 and the casing 8 are connected by a handle 9 which provides an easy manner of transportation.

The casings are also connected together by a gear housing preferably formed in two halves and designated by the numeral 11. Within this gear housing is positioned a plurality of gears, one of which is secured to the shaft 12 which is rotated through the medium of a lever 13 and handle 14.

This serves to drive a blower fan positioned within the blower casing 8. Air from the blower is taken in the customary manner through openings 16 and discharged through a funnel-like outlet 17 to which a flexible hose 18 is secured.

In order to discharge fluid from the tank 7 I provide a pump 19. The purpose of this pump is to place a slight pressure upon the top of the fluid. A pipe 21 extends from the bottom of the tank 7 to a measuring cup 22 which is preferably made of glass so that the amount of fluid therein may be readily seen.

Two valves are positioned within the measuring cup, one of which is attached to the pipe 21 and the other to the pipe 23. The pipe 23 extends to the blower casing and discharges thereinto at a point near its center.

The result of this construction is that by manipulating the pump 19 a few times a slight pressure will be placed upon the fluid within the tank 7, which fluid is preferably carbon bisulfide.

By now opening the valve A, this fluid will flow through the pipe 21 into the measuring cup 22 and as soon as the same has been filled, the valve A is closed and the valve B is moved to open position and this will permit the liquid in the measuring cup to be readily dispensed through the pipe 23 to the blower.

By now operating the lever 13 so as to cause the blower to function, it will be apparent that air drawn from the atmosphere through the opening 16 will be saturated with the fluid and will be discharged through the funnel 17 and pipe 18 and as the end of the pipe is placed in the burrow, it will be evident that the death dealing gas will be projected into the burrow.

It will thus be seen that I have provided a simple and efficient device for accomplishing the objects herein set forth.

It is to be understood that the form of my invention herewith shown and described is to be taken as a preferred example of the same, and that various changes relative to the shape, size, material and arrangement of parts may be resorted to without departing from the spirit of the invention or the scope of the subjoined claim.

Having thus described my invention, I claim:—

In a device of the character described a tank, a blower positioned adjacent said tank, a measuring cup positioned adjacent said tank and said blower, a pipe extending from said measuring cup to said tank, a valve positioned within said pipe, a pipe extending from said measuring cup to said blower, a valve positioned within said last mentioned pipe, means for rotating said blower for the purpose of forcing the products of said blower and said tank to a remote point.

In testimony whereof I affix my signature.

WARREN ABBY.